United States Patent
Cheng et al.

(10) Patent No.: US 7,452,956 B2
(45) Date of Patent: Nov. 18, 2008

(54) URETHANE COMPOSITIONS CONTAINING CARBINOL-FUNCTIONAL SILICONE RESINS

(75) Inventors: Tammy Cheng, Midland, MI (US); Michael Ferritto, Midland, MI (US); Glenn Gordon, Midland, MI (US); John Bernard Horstman, Midland, MI (US); Randall Schmidt, Midland, MI (US); Gary Wieber, Midland, MI (US); Gerald Lawrence Witucki, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 465 days.

(21) Appl. No.: 10/568,515

(22) PCT Filed: Oct. 8, 2004

(86) PCT No.: PCT/US2004/033190

§ 371 (c)(1),
(2), (4) Date: Feb. 15, 2006

(87) PCT Pub. No.: WO2005/037887

PCT Pub. Date: Apr. 28, 2005

(65) Prior Publication Data

US 2007/0093618 A1    Apr. 26, 2007

Related U.S. Application Data

(60) Provisional application No. 60/510,235, filed on Oct. 10, 2003.

(51) Int. Cl.
*C08G 77/458* (2006.01)
(52) U.S. Cl. .............................. 528/25; 528/28; 528/44; 528/85
(58) Field of Classification Search ........................ None
See application file for complete search history.

(56) References Cited

U.S. PATENT DOCUMENTS

| | | |
|---|---|---|
| 4,125,510 A | 11/1978 | Antonen |
| 4,157,357 A | 6/1979 | Mine et al. |
| 4,202,807 A | 5/1980 | Moretto et al. |
| 4,234,697 A | 11/1980 | Homan et al. |
| 4,657,986 A | 4/1987 | Isayama et al. |
| 4,684,534 A | 8/1987 | Valentine |
| 4,722,951 A | 2/1988 | Yoshioka et al. |
| 4,795,680 A | 1/1989 | Rich et al. |
| 4,877,822 A | 10/1989 | Itoh et al. |
| 5,013,577 A | 5/1991 | Wright et al. |
| 5,102,960 A | 4/1992 | Imai et al. |
| 5,126,126 A | 6/1992 | Varaprath et al. |
| 5,135,993 A | 8/1992 | Decker et al. |
| 5,152,984 A | 10/1992 | Varaprath et al. |
| 5,262,507 A | 11/1993 | Decker et al. |
| 5,283,279 A | 2/1994 | Hara et al. |
| 5,290,882 A | 3/1994 | Shiobara et al. |
| 5,290,901 A | 3/1994 | Burns et al. |
| 5,362,821 A | 11/1994 | Decker et al. |
| 5,378,532 A | 1/1995 | Decker et al. |
| 5,405,688 A | 4/1995 | Decker et al. |
| 5,431,765 A | 7/1995 | Decker et al. |
| 5,516,858 A | 5/1996 | Morita et al. |
| 5,814,679 A | 9/1998 | Eckberg et al. |
| 5,840,806 A | 11/1998 | Komazaki et al. |
| 5,891,969 A | 4/1999 | Mine et al. |
| 5,939,491 A | 8/1999 | Wilt et al. |
| 5,952,439 A | 9/1999 | Morita et al. |
| 6,071,990 A | 6/2000 | Yip et al. |
| 6,297,331 B1 | 10/2001 | Langenhagen et al. |
| 6,610,777 B1 | 8/2003 | Anderson et al. |
| 2005/0010275 A1* | 1/2005 | Sahatjian et al. ........... 623/1.11 |

FOREIGN PATENT DOCUMENTS

WO    WO 03/080696    * 10/2003

* cited by examiner

*Primary Examiner*—Marc S Zimmer
(74) *Attorney, Agent, or Firm*—Patricia M. Scaduto

(57) ABSTRACT

This invention relates to urethane compositions comprising: (A) 100 weight parts of at least one compound containing at least one isocyanate group; (B) 0.3-300 weight parts of a carbinol-functional silicone resin; (C) up to 250 weight parts of an organic polyol; and (D) up to 10 weight parts of a cure rate modifier. The urethane compositions of this invention are useful as a stand-alone coating or as ingredients in protective coatings, paint formulations, and powder coatings. The urethane compositions of this invention can also be formulated with a blowing agent and cell stabilizer to produce thermally stable foam formulations.

19 Claims, No Drawings

URETHANE COMPOSITIONS CONTAINING CARBINOL-FUNCTIONAL SILICONE RESINS

CROSS REFERENCE TO RELATED APPLICATIONS

This application is a U.S. national stage filing under 35 U.S.C. §371 of PCT application Ser. No. PCT/US2004/033190 filed on 08 Oct. 2004, currently pending, which claims the benefit of U.S. Provisional patent application Ser. No. 60/510235 filed 10 Oct. 2003 under 35 U.S.C. §119 (e). PCT Application No. PCT/US2004/033190 and U.S. Provisional Patent Application Ser. No. 60/510235 are hereby incorporated by reference.

Siloxane resins are known in the art to have exceptional thermal stability and weatherability including low water absorption. However, their poor toughness, adhesion and dimensional stability (low Tg, high CTE) leapt their utility. Urethane resins exhibit very good toughness, but suffer from marginal thermal stability and weatherability. This invention relates to the use of carbinol-functional silicone resins as a component in preparing urethane compositions which can act as protective coatings, for example, as wood floor coatings or in electronics packaging. Alternatively, cell stabilizers and foaming agents can be added to the urethane compositions of this invention to produce polyurethane foams with enhanced thermal stability. Carbinol-containing siloxanes have been used in urethane compositions in the art. For example, in U.S. Pat. No. 4,684,538 is disclosed silicone urethane compounds, e.g., a polysiloxane urethane (meth)acrylate, obtained as a reaction product of a polysiloxane carbinol, a polyisocyanate, and a polyfunctional compound having at least one functional group which is reactive with an isocyanate group of the polyisocyanate and after reaction therewith provides an ethylenic functional group in the reaction product. The polysiloxane carbinol has a molecular weight of from about 5,000 to about 50,000 and has R'OH end groups wherein R' is linear $C_4$-$C_{20}$ alkylene. Such carbinol may be obtained as a reaction product of the corresponding hydride-terminated polysiloxane and a linear $C_4$-$C_{20}$ omega-alkenyl alcohol. The disclosed compounds may be utilized in adhesive compositions for substrates including bonding surfaces such as glass, and polymers and copolymers of ethylenically unsaturated monomers.

In U.S. Pat. No. 5,814,679 is disclosed blends of photocurable silicone compositions with long chain silicone compounds that contain carbinol functionalities. The '679 patent further discloses that the long chain carbinol containing silicones co-polymerize or co-cure with epoxy functional photo curable silicones thereby permitting the formulation of premium release photo-curable silicone compositions.

U.S. Pat. No. 6,610,777 discloses a coating composition formed from components comprising: (a) at least one polysiloxane comprising at least one reactive functional group, the at least one polysiloxane comprising at least one of the following structural units (I):

wherein each $R^1$, which may be identical or different, represents H, OH, a monovalent hydrocarbon group or a monovalent siloxane group; each $R^2$, which may be identical or different, represents a group comprising at least one reactive functional group, wherein m and n fulfill the requirements of 0<n<4, 0<m<4 and 2<(m+n)≧4; (b) at least one polyol having a hydroxyl value ranging from 100 to 200; and (c) at least one reactant comprising at least one functional group that is reactive with at least one functional group selected from the at least one reactive functional group of the at least one polysiloxane (a) and at least one functional group of the at least one polyol (b), wherein each component is different, and wherein a coating formed from the coating composition when cured has a flexibility rating of at least 6 according to a Flexibility Test Method at a temperature of 70° F.

In U.S. Pat. No. 5,939,491 is disclosed curable compositions comprising an organic polysiloxane which can contain a variety of reactive functional groups and a curing agent which contains functional groups reactive with the functional groups of the polysiloxanes. Such curable compositions are particularly useful in coating compositions which are curable at both ambient and thermal cure conditions where they provide such excellent properties as increased pot-life, improved tack-time, adhesion, mar resistance and acid etch resistance.

The curable composition comprises an organic polysiloxane containing reactive functional groups, said polysiloxane having the general structure:

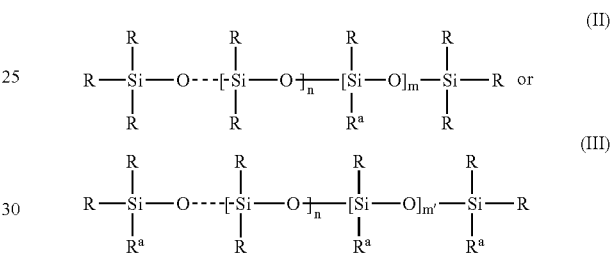

where m is at least 1; m' is 0 to 50; n is 0 to 50; R is selected from the group consisting of OH and monovalent hydrocarbon groups connected to the silicon atoms; $R^a$ has the following structure: $R_1$—O—X wherein $R_1$ is alkylene, oxyalkylene or alkylene aryl; and X is a moiety containing a functional group selected from the group consisting of OH, COOH, NCO, carboxylate such as ester, carbonate and anhydride, primary amine, secondary amine, amide, carbamate and epoxy functional groups; and a component which contains functional groups reactive with the functional groups of the organic polysiloxane. Preferably, the curable composition comprises: (a) an organic polysiloxane containing reactive functional groups, the polysiloxane having the formula (II) or (III), where m, m', n, R, Ra and X are as described above; (b) a polymer or oligomer which contains reactive functional groups; and (c) a curing agent containing functional groups which are reactive with the functional groups of (a) and (b). In one preferred embodiment n+m and n+m' is 2 or 3.

This invention relates to urethane compositions comprising: (A) 100 weight parts of at least one compound containing at least one isocyanate group; (B) 3-300 weight parts of a carbinol-functional silicone resin comprising the units:

$(R^1{}_3SiO_{1/2})_a$ (i)
$(R^2{}_2SiO_{2/2})_b$ (ii)
$(R^3SiO_{3/2})_c$ (iii) and
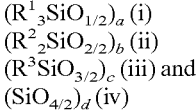 (iv)

wherein $R^1$ and $R^2$ are each independently a hydrogen atom, an alkyl group having from 1 to 8 carbon atoms, an aryl group, a carbinol group free of aryl groups having at least 3 carbon atoms, or an aryl-containing carbinol group having at least 6 carbon atoms, $R^3$ is an alkyl group having from 1 to 8 carbon atoms or an aryl group, a has a value of less than or equal to 0.6, b has a value of zero or greater than zero, c has a value of greater than zero, d has a value of less than 0.5, and the value of a+b+c+d=1, and with the proviso that when each $R^2$ is methyl the value of b is less than 0.3; (C) up to 250 weight parts of an organic polyol; and (D) up to 10 weight parts of a cure rate modifier.

Another embodiment of the invention relates to urethane compositions comprising: (A) 100 weight parts of at least one compound containing at least one isocyanate group; (i) 0.3-300 weight parts of a carbinol-functional silicone resin comprising the units:

$(R^1_3SiO_{1/2})_a$ (i)
$(R^2_2SiO_{2/2})_b$ (ii)
$(R^3SiO_{3/2})_c$ (iii) and
$(SiO_{4/2})_d$ (iv)

wherein $R^1$ and $R^2$ are each independently a hydrogen atom, an alkyl group having from 1 to 8 carbon atoms, an aryl group, a carbinol group free of aryl groups having at least 3 carbon atoms, or an aryl-containing carbinol group having at least 6 carbon atoms, $R^3$ is an alkyl group having from 1 to 8 carbon atoms or an aryl group, a has a value of less than or equal to 0.6, b has a value of zero or greater than zero, c has a value of greater than zero, d has a value of less than 0.5, and the value of a+b+c+d=1, and with the proviso that when each $R^2$ is methyl the value of b is less than 0.3 and with the proviso there is on average at least one carbinol group per resin molecule; (C) up to 250 weight parts of an organic polyol; and (D) up to 10 weight parts of a cure rate modifier, where the mole ratio of carbinol groups to isocyanate groups is from about 0.8:1 to 1.2:1.

Another embodiment of the invention relates to urethane compositions comprising: (A) at least one compound containing at least one isocyanate group; and (B) a carbinol-functional silicone resin comprising the units:

$(R^1_3SiO_{1/2})_a$ (i)
$(R^2_2SiO_{2/2})_b$ (ii)
$(R^3SiO_{3/2})_c$ (iii) and
$(SiO_{4/2})_d$ (iv)

wherein $R^1$ and $R^2$ are each independently a hydrogen atom, an alkyl group having from 1 to 8 carbon atoms, an aryl group, a carbinol group free of aryl groups having at least 3 carbon atoms, or an aryl-containing carbinol group having at least 6 carbon atoms, $R^3$ is an alkyl group having from 1 to 8 carbon atoms or an aryl group, a has a value of less than or equal to 0.6, b has a value of zero or greater than zero, c has a value of greater than zero, d has a value of less than 0.5, and the value of a+b+c+d=1, and with the proviso that when each $R^2$ is methyl the value of b is less than 0.3; where the mole ratio of carbinol groups to isocyanate groups is from about 0.8:1 to 1.2:1.

Another embodiment of this invention relates to a urethane composition obtained by a method comprising reacting (A) 100 weight parts of at least one compound containing at least one isocyanate group; (B) 3-300 weight parts of a carbinol-functional silicone resin comprising the units:

$(R^1_3SiO_{1/2})_a$ (i)
$(R^2_2SiO_{2/2})_b$ (ii)
$(R^3SiO_{3/2})_c$ (iii) and
$(SiO_{4/2})_d$ (iv)

wherein $R^1$ and $R^2$ are each independently a hydrogen atom, an alkyl group having from 1 to 8 carbon atoms, an aryl group, a carbinol group free of aryl groups having at least 3 carbon atoms, or an aryl-containing carbinol group having at least 6 carbon atoms, $R^3$ is an alkyl group having from 1 to 8 carbon atoms or an aryl group, a has a value of less than or equal to 0.6, b has a value of zero or greater than zero, c has a value of greater than zero, d has a value of less than 0.5, and the value of a+b+c+d=1, and with the proviso that when each $R^2$ is methyl the value of b is less than 0.3; (C) up to 250 weight parts of an organic polyol; and (D) up to 10 weight parts of a cure rate modifier.

Another embodiment of this invention relates to a urethane composition obtained by a method comprising reacting (A) 100 weight parts of at least one compound containing at least one isocyanate group; (B) 0.3-300 weight parts of a carbinol-functional silicone resin comprising the units:

$(R^1_3SiO_{1/2})_a$ (i)
$(R^2_2SiO_{2/2})_b$ (ii)
$(R^3SiO_{3/2})_c$ (iii) and
$(SiO_{4/2})_d$ (iv)

wherein $R^1$ and $R^2$ are each independently a hydrogen atom, an alkyl group having from 1 to 8 carbon atoms, an aryl group, a carbinol group free of aryl groups having at least 3 carbon atoms or an aryl-containing carbinol group having at least 6 carbon atoms, $R^3$ is an alkyl group having from 1 to 8 carbon atoms or an aryl group, a has a value of less than or equal to 0.6, b has a value of zero or greater than zero, c has a value of greater than zero, d has a value of less than 0.5, and the value of a+b+c+d=1, and with the proviso that when each $R^2$ is methyl the value of b is less than 0.3 and with the proviso there is on average at least one carbinol group per resin molecule (C) up to 250 weight parts of an organic polyol; and (D) up to 10 weight parts of a cure rate modifier, where the mole ratio of carbinol groups to isocyanate groups is from about 0.8:1 to 1.2:1.

Another embodiment of this invention relates to a urethane composition obtained by a method comprising reacting (A) at least one compound containing at least one isocyanate group; and (B) a carbinol-functional silicone resin comprising the units:

$(R^1_3SiO_{1/2})_a$ (i)
$(R^2_2SiO_{2/2})_b$ (ii)
$(R^3SiO_{3/2})_c$ (iii) and
$(SiO_{4/2})_d$ (iv)

wherein $R^1$ and $R^2$ are each independently a hydrogen atom, an alkyl group having from 1 to 8 carbon atoms, an aryl group, a carbinol group free of aryl groups having at least 3 carbon atoms, or an aryl-containing carbinol group having at least 6 carbon atoms, $R^3$ is an alkyl group having from 1 to 8 carbon atoms or an aryl group, a has a value of less than or equal to 0.6, b has a value of zero or greater than zero, c has a value of greater than zero, d has a value of less than 0.5, and the value of a+b+c+d=1, and with the proviso that when each $R^2$ is methyl the value of b is less than 0.3; where the mole ratio of carbinol groups to isocyanate groups is from about 0.8:1 to 1.2:1.

Component (A) can be any multi-isocyanate group containing molecules which have been used previously in the preparation of crosslinked urethanes. The compounds containing at least one isocyanate group of Component (A) are illustrated by isophorone diisocyanate trimers, isophorone diisocyanate, toluene diisocyanate, polyisocyanates, tetramethylxylylene diisocyanate, phenylene diisocyanate, xylene diisocyanate, 1,5-naphthalene diisocyanate, chlorophenylene 2,4-diisocyanate, bitoluene diisocyanate, dianisidine diisocyanate, toluidine diisocyanate and alkylated benzene diisocyanates generally; methylene-interrupted aromatic diisocyanates such as methylene-diphenyl-diisocyanate, especially the 4,4'-isomer (MDI) including alkylated analogs such as 3,3'-dimethyl-4,4'-diphenyl-methane diisocyanate; such hydrogenated materials as cyclohexylene diisocyanate, 4,4'-methylenedicyclohexyl diisocyanate; mixed aralkyl diisocyanates such as the tetramethylxylyl diisocyanates, OCNC(CH$_3$)$_2$ C$_6$H$_4$C(CH$_3$)$_2$NCO, and the diisocyanate popularly referred to as isophorone diisocyanate, which is 3,3,5-trimethyl-5-isocyanato-methylcyclohexyl isocyanate; and polymethylene isocyanates such as 1,4-tetramethylene diisocyanate, 1,5-pentamethylene diisocyanate, 1,6-hexamethylene diisocyanate (HMDI), 1,7-heptamethylene diisocyanate, 2,2, 4- and 2,4,4-trimethylhexamethylene diisocyanate, 1,10-decamethylene diisocyanate, and 2-methyl-1,5-pentamethylene diisocyanate. The above isocyanates can be used alone or in combination.

Commercially available materials suitable as component (A) are illustrated by Tolonate XIDT 70SB an isophorone diisocyanate trimer (70% solids, 12.3 wt % NCO) sold by Rhodia (Cranbury, N.J.) and Desmodur N-100 polyisocyanate (available from Mobay Corp.).

For the purposes of this invention "carbinol group" is defined as any group containing at least one carbon-bonded hydroxyl (COH) group. Thus the carbinol groups may contain more than one COH group such as for example

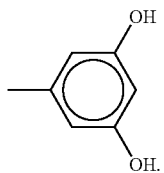

The alkyl groups of $R^1$ and $R^2$ in the carbinol-functional silicone resin of Component (B) are illustrated by methyl, ethyl, propyl, butyl, pentyl, hexyl, and octyl, with the alkyl group typically being methyl. The aryl groups of $R^1$ and $R^2$ are illustrated by phenyl, naphthyl, benzyl, tolyl, xylyl, xenyl, methylphenyl, 2-phenylethyl, 2-phenyl-2-methylethyl, chlorophenyl, bromophenyl and fluorophenyl with the aryl group typically being phenyl.

The carbinol group free of aryl groups having at least 3 carbon atoms is illustrated by groups having the formula $R^4$OH wherein $R^4$ is a divalent hydrocarbon group having at least 3 carbon atoms or a divalent hydrocarbonoxy group having at least 3 carbon atoms. The group $R^4$ is illustrated by alkylene groups selected from —(CH$_2$)$_x$— where x has a value of 3 to 10, —CH$_2$CH(CH$_3$)—, —CH$_2$CH(CH$_3$)CH$_2$—, —CH$_2$CH$_2$CH(CH$_2$CH$_3$)CH$_2$CH$_2$CH$_2$—, and —OCH(CH$_3$)(CH$_2$)$_x$— wherein x has a value of 1 to 10. The carbinol group free of aryl groups having at least 3 carbon atoms is also illustrated by groups having the formula having the formula $R^6$(OH) CH$_2$OH and $R^6$ is a group having the formula —CH$_2$CH$_2$(CH$_2$)$_x$OCH$_2$CH— wherein x has a value of 1 to 10.

The aryl-containing carbinol group having at least 6 carbon atoms is illustrated by groups having the formula $R^5$OH wherein $R^5$ is an arylene group selected from —(CH$_2$)$_x$C$_6$H$_4$— wherein x has a value of 0 to 10, —CH$_2$CH(CH$_3$)(CH$_2$)$_x$C$_6$H$_4$— wherein x has a value of 0 to 10, and —(CH$_2$)$_x$C$_6$H$_4$(CH$_2$)$_x$— wherein x has a value of 1 to 10. The aryl-containing carbinol groups typically have from 6 to 14 atoms.

In the carbinol-functional silicone resin, Component (B), a has a typical value of 0.1 to 0.6, alternatively 0.2 to 0.4, b has a typical value of 0 to 0.4, alternatively 0 to 0.1, c has a typical value of 0.3 to 0.8, alternatively 0.4 to 0.8, d has a typical value of 0 to 0.3, alternatively zero. When each $R^2$ is methyl the value of b is less than 0.3, alternatively less than 0.1.

The carbinol-functional silicone resins have on average at least one carbinol group per resin molecule. Typically, the equivalent weight of carbinol groups on the carbinol-functional silicone resin is from 100 to 1000, alternatively 200 to 800.

Typically, when $R^1$ or $R^2$ of the carbinol-functional silicone resin contains a carbinol group, only one carbinol group will be present on each such $R^1$ or $R^2$.

The carbinol-functional silicone resins of Component (B) are illustrated by carbinol-functional silicone resins comprising the units:
((CH$_3$)$_3$SiO$_{1/2}$)$_a$
((R$^2$)CH$_3$SiO$_{2/2}$)$_b$ where $R^2$=—(CH$_2$)$_3$C$_6$H$_4$OH
((C$_6$H$_5$)CH$_3$SiO$_{2/2}$)$_b$ and
(C$_6$H$_5$SiO$_{3/2}$)$_c$, carbinol-functional silicone resins comprising the units:
((R$^1$)(CH$_3$)$_2$SiO$_{1/2}$)$_a$ where $R^1$=—(CH$_2$)$_3$C$_6$H$_4$OH and
(C$_6$H$_5$SiO$_{3/2}$)$_c$, carbinol-functional silicone resins comprising the units:
((R$^1$)(CH$_3$)$_2$SiO$_{1/2}$)$_a$ where $R^1$=—(CH$_2$)$_3$C$_6$H$_4$OH and
(CH$_3$SiO$_{3/2}$)$_c$, carbinol-functional silicone resins comprising the units:
((R$^1$)(CH$_3$)$_2$SiO$_{1/2}$)$_a$ where $R^1$=—(CH$_2$)$_3$C$_6$H$_4$OH and
(C$_6$H$_5$SiO$_{3/2}$)$_c$, carbinol-functional silicone resins comprising the units:
((R$^1$)(CH$_3$)$_2$SiO$_{1/2}$)$_a$ where $R^1$=—(CH$_2$)$_3$OH
(CH$_3$SiO$_{3/2}$)$_c$ and
(C$_6$H$_5$SiO$_{3/2}$)$_c$, carbinol-functional silicone resins comprising the units:
((CH$_3$)$_3$SiO$_{1/2}$)$_a$
((R$^2$)CH$_3$SiO$_{2/2}$)$_b$ where $R^2$=—(CH$_2$)$_3$OH
((C$_6$H$_5$)CH$_3$SiO$_{2/2}$)$_b$ and
(C$_6$H$_5$SiO$_{3/2}$)$_c$, carbinol-functional silicone resins comprising the units:
((CH$_3$)$_3$SiO$_{1/2}$)$_a$
((R$^1$)(CH$_3$)$_2$SiO$_{1/2}$)$_a$ where $R^1$=—(CH$_2$)$_3$OH and
(C$_6$H$_5$SiO$_{3/2}$)$_c$, carbinol-functional silicone resins comprising the units:
((R$^1$)(CH$_3$)$_2$SiO$_{1/2}$)$_a$ where $R^1$=—CH$_2$CH(CH$_3$)CH$_2$OH
((H)(CH$_3$)$_2$SiO$_{1/2}$)$_a$ and
(C$_6$H$_5$SiO$_{3/2}$)$_c$, and carbinol-functional silicone resins comprising the units:
((R$^1$)(CH$_3$)$_2$SiO$_{1/2}$)$_a$ where $R^1$=—(CH$_2$)$_3$OH
(CH$_3$SiO$_{3/2}$)$_c$ wherein a has a typical value of 0.1 to 0.6, b has a typical value of zero to 0.4, and c has a typical value of 0.3 to 0.8.

Preferably, the $R^1$+$R^2$+$R^3$ groups in the carbinol-functional silicone resin contain high enough phenyl content to provide appropriate compatibility with component (A). Typically greater than 10 weight percent of the $R^1$+$R^2$+$R^3$ groups are phenyl and even more typically greater than 25 weight percent of the $R^1$+$R^2$+$R^3$ groups are phenyl.

The carbinol-functional silicone resins are prepared by a method comprising reacting:
(A') at least one hydrogen-functional silicone resin comprising the units:
(R$^7$$_3$SiO$_{1/2}$)$_a$ (i)
(R$^8$$_2$SiO$_{2/2}$)$_b$ (ii)
(R$^3$SiO$_{3/2}$)$_c$ (iii) and
(SiO$_{4/2}$)$_d$ (iv)

wherein $R^7$ and $R^8$ are each independently an alkyl group having from 1 to 8 carbon atoms, an aryl group, or a hydrogen atom, $R^3$, a, b, c, and d are as defined above, the value of a+b+c+d=1, with the proviso that when each $R^8$ is methyl the value of b is less than 0.3, with the proviso that there are at least two silicon-bonded hydrogen atoms present in the silicone resin; and (B') at least one vinyl-terminated alcohol; in the presence of (C') a hydrosilylation catalyst; and optionally (D') at least one solvent. The method to manufacture the carbinol-functional silicone resins of Component (B) is disclosed in detail in a copending patent application entitled "Carbinol-functional Silicone Resins" which is herein incorporated by reference.

The alkyl groups and aryl groups of $R^7$ and $R^8$ are as described above for $R^1$ and $R^2$.

Component (C), the organic polyol (synonymous with organic carbinol) is illustrated by ethylene glycol, 1,2-propylene glycol, 1,3-propylene glycol, 1,4-butylene glycol, 2,3-butylene glycol, 1,6-hexanediol, 1,8-octanediol, neopentyl glycol, cyclohexane dimethanol, 2-methyl-1,3-propanediol, glycerol, trimeth1,2,61, 1,2,4-butanetriol, pentaerythritol, mannitol, sorbitol, diethylene glycol, triethylene glycol, tetraethylene glycol, poly(ethyleneoxy) glycols generally, dipropylene glycol, poly(propyleneoxy) glycols generally, dibutylene glycol, poly(butyleneoxy) glycols, and polycaprolactone. Other polyhydroxy materials of higher molecular weight which may be used are the polymerization products of epoxides such as ethylene oxide, propylene oxide, butylene oxide, styrene oxide, and epichlorohydrin. Hydroxyl-containing polyesters, polythioethers, polyacetals, polycarbonates, and polyester amides also may be used alone or in combination with the above polyols. Suitable polyesters include the reaction product of polyhydric alcohols and polybasic, preferably dibasic, carboxylic acids. The polyhydric alcohols which are often used include the dihydric alcohols mentioned above. Examples of dicarboxylic acids include succinic acid, adipic acid, suberic acid, azelaic acid, sebacic acid, glutaric acid, phthalic acid, maleic acid, and fumaric acid. Typical polyether polyols are illustrated by polyalkylene ether polyols having the formula $HO(RO)_nH$ wherein R is an alkylene group and n is an integer large enough that the polyether polyol has a number average molecular weight of at least 250. These polyalkylene ether polyols are well-known components of polyurethane products and can be prepared by the polymerization of cyclic ethers such as alkylene oxides and glycols, dihydroxyethers, and the like by known methods. A particularly common high molecular weight polyol is polytetramethylene glycol.

Component (D), the cure rate modifier can be any material that affects the cure time of the urethane composition and includes cure accelerators, cure inhibitors, and cure catalysts. Examples include phosphine compounds, such as tributylphosphine, triphenylphosphine, tris(dimethoxyphenyl) phosphine, tris(hydroxypropyl)phosphine and tris(cyanoethyl)phosphine; phosphonium salts, such as tetraphenylphosphonium tetraphenylborate, methyltributylphosphonium tetraphenylborate and methyltricyanoethyl phosphonium tetraphenylborate; imidazoles, such as 2-methyl imidazole, 2-phenyl imidazole, 2-ethyl-4-methyl imidazole, 2-undecyl imidazole, 1-cyanoethyl-2-methyl imidazole, 1,4-dicyano-6-[2-methylimidazolyl-(1)]-ethyl-S-triazine and 2,4-dicyano-6-[2-undecylimidazolyl-(1)]-ethyl-S-triazine; imidazolium salts, such as 1-cyanoethyl-2-undecylimidazolium trimellitate, 2-methylimidazolium isocyanurate, 2-ethyl-4-methylimidazolium tetraphenylborate and 2-ethyl-1,4-dimethylimidazolium tetraphenylborate; amines, such as 2,4,6-tris(dimethylaminomethyl)phenol, benzyl dimethylamine, tetramethylbutyl guanidine, N-methyl piperazine and 2-dimethylamino-1-pyrroline; ammonium salts, such as triethylammonium tetraphenylborate; diazabicyclo compounds, such as 1,5-diazabicyclo(5,4,0)-7-undecene, 1,5-diazabicyclo(4,3,0)-5-nonene and 1,4-diazabicyclo(2,2,2)-octane; and tetraphenylborates, phenol salts, phenol novolak salts and 2-ethylhexanoates of those diazabicyclo compounds, and alcohols such as resorcinol. Of these compounds tertiary amines, phosphine compounds, imidazole compounds, diazabicyclo compounds and their salts are typically used. Dicyandiamide and boron trifluoride may also be used.

The cure rate modifier Component (D) can also be illustrated by compounds having an aliphatic unsaturated bond, organophosphorous compounds, organosulfur compounds, nitrogen-containing compounds, and tin compounds. Examples of the compounds having an aliphatic unsaturated bond include propargyl alcohol, ene-yne compounds, and maleic esters such as dimethyl maleate. Examples of the organophosphorus compounds are triorganophosphines, diorganophosphines, organophosphones, and triorganophosphites. The organosulfur compounds include organomercaptanes, diorganosulfides, hydrogen sulfide, benzothiazole, and benzothiazole disulfite. The nitrogen-containing compounds include ammonia, primary, secondary or tertiary alkylamines, arylamines, urea, and hydrazine. The amines are illustrated by triethylamine, tributylamine, N-methylmorpholine, N-ethylmorpholine, 1,4-diaza-bicyclo-(2,2,2)-octane, N-cetyl dimethylamine, N-methyl-N'-dimethylaminoethyl-piperazine, N,N-dimethylbenzylamine, N,N-dimethylcyclohexylamine, and 1,2-dimethylimidazole. Organic tin compounds may also be used and include such materials as the tin(II) salts of carboxylic acids such as tin(II) acetate, tin(II) octoate, tin(II) ethylhexoate and tin(II) laurate, as well as such materials as the dialkyl tin salts of carboxylic acids as exemplified by dibutyltindiacetate, dibutyltindilaurate, dibutyltinmaleate, and dioctyltindiacetate. Such tin salts may be used either alone or as a complex with amidines such as amino pyridines, amino pyrimidines, hydrazino pyridines, and tetrahydropyrimidines. Other metal-based compounds such as lead, iron, mercury, bismuth, cobalt and manganese also may be used, and include compounds such as cobalt(III) acetylacetonate, cobalt naphthoate, manganese naphthoate, lead oleate, zinc naphthenate and zirconium naphthenate. Other compounds such as silaamines and basic nitrogen compounds such as tetraalkylammonium hydroxide, alkali metal hydroxides such as sodium hydroxide, and alkali metal alcoholates such as sodium methylate may also be used. The cure rate modifiers of component (D) are generally used in an amount from about 0.01 to about 10% by weight, preferably from about 0.05 to about 1.0% by weight, based on the quantity of polyisocyanate and the quantity of materials reacting with the polyisocyanate.

Typically, the mole ratio of carbinol groups to isocyanate groups in the urethane composition is from about 0.8:1 to 1.2:1.

The urethane compositions of the present invention may further comprise other components that are conventionally employed in polymerizable systems. These components include, but are not limited to, solvents, plasticizers, pigments, colorants, dyes, surfactants, thickeners, heat stabilizers, leveling agents, anti-cratering agents, fillers, sedimentation inhibitors, ultraviolet-light absorbers, and the like. Additives such as promoters, heat stabilizers, ultraviolet-light absorbers, etc. may be intimately dispersed in the reaction mixture and apparently thereby become an integral part of the polymer. Preferred antioxidants are sterically hindered phenolic compounds. Stabilizers such as organic phosphites are also useful. Preferred UV inhibitors are benzotriazole compounds.

The urethane compositions of this invention can further comprise at least one filler illustrated by hollow microspheres, fumed silica, precipitated silica, hydrous silicic acid, carbon black, ground quartz, calcium carbonate, magnesium carbonate, diatomaceous earth, wollastonite, calcined clay, clay, talc, kaolin, titanium oxide, bentonite, ferric oxide, zinc oxide, glass balloon, glass beads, mica, glass powder, glass balloons, coal dust, acrylic resin powder, phenolic resin powder, ceramic powder, zeolite, slate powder, organic fibers, and inorganic fibers.

The urethane compositions of this invention can further comprise at least one cell stabilizer and at least one blowing agent, and optionally chain extenders and crosslinkers. The cell stabilizers are illustrated by silicones, with silicone polyethers being typically used. The blowing agents are illustrated by water, liquid carbon dioxide, CFCs, HCFCs, HFCs, and pentane, with water or a mixture of water and HCFC being typically used. The addition of these ingredients to the urethane compositions of this invention produce polyurethane foam compositions having enhanced thermal stability.

The urethane compositions of this invention may be prepared by mixing (or mechanically agitating) components (A) and (B), and any optional components, to form a homogenous mixture. This may be accomplished by any convenient mixing method known in the art exemplified by a spatula, mechanical stirrers, in-line mixing systems containing baffles and/or blades, powered in-line mixers, homogenizers, a drum roller, a three-roll mill, a sigma blade mixer, a bread dough mixer, and a two roll mill. The order of mixing is not considered critical. Components (A) and (B) and any optional components, may be pre-mixed and applied or mixed during application if tack free time is short.

This invention also relates to a urethane composition obtained by a method comprising reacting (A) 100 weight parts of at least one compound containing at least one isocyanate group; (B) 3-300 weight parts of a carbinol-functional silicone resin comprising the units:
$(R^1_3SiO_{1/2})_a$ (i)
$(R^2_2SiO_{2/2})_b$ (ii)
$(R^3SiO_{3/2})_c$ (iii) and
$(SiO_{4/2})_d$ (iv)
wherein $R^1$, $R^2$, $R^3$, a, b, c, and d are as defined above, the value of, and the value of a+b+c+d=1, and with the proviso that when each $R^2$ is methyl the value of b is less than 0.3; (C) up to 250 weight parts of an organic polyol; and (D) up to 10 weight parts of a cure rate modifier.

Another embodiment of this invention relates to a urethane composition obtained by a method comprising reacting (A) 100 weight parts of at least one compound containing at least one isocyanate group; (B) 0.3-300 weight parts of a carbinol-functional silicone resin comprising the units:
$(R^1_3SiO_{1/2})_a$ (i)
$(R^2_2SiO_{2/2})_b$ (ii)
$(R^3SiO_{3/2})_c$ (iii) and
$(SiO_{4/2})_d$ (iv)
wherein $R^1$, $R^2$, $R^3$, a, b, c, and d are as defined above, and the value of a+b+c+d=1, with the proviso that when each $R^2$ is methyl the value of b is less than 0.3 and with the proviso there is on average at least one carbinol group per resin molecule, ; (C) up to 250 weight parts of an organic polyol; and (D) up to 10 weight parts of a cure rate modifier, where the mole ratio of carbinol groups to isocyanate groups in the urethane composition is from about 0.8:1 to 1.2:1.

Another embodiment of this invention relates to a urethane composition obtained by a method comprising reacting (A) at least one compound containing at least one isocyanate group; and (B) a carbinol-functional silicone resin comprising the units:
$(R^1_3SiO_{1/2})_a$ (i)
$(R^2_2SiO_{2/2})_b$ (ii)
$(R^3SiO_{3/2})_c$ (iii) and
$(SiO_{4/2})_d$ (iv)
wherein $R^1$, $R^2$, $R^3$, a, b, c, and d are as defined above,, and the value of a+b+c+d=1, and with the proviso that when each $R^2$ is methyl the value of b is less than 0.3; where the mole ratio of carbinol groups to isocyanate groups is from about 0.8:1 to 1.2:1.

"Reacting" as used herein means mixing components (A) and (B) and any optional components at room temperature (20-25° C.) or heating a mixture comprising components (A) and (B) and any optional components to temperatures above room temperature such as at temperatures of up to 200° C. Components (A)-(D) are as described above.

The urethane compositions of this invention are useful as a stand-alone coating or as ingredients in protective coatings, paint formulations, and powder coatings. The urethane compositions of this invention can also be formulated with a blowing agent and cell stabilizer to produce thermally stable foam formulations.

EXAMPLES

Materials:
Isocyanate: Tolonate XIDT 70SB is an isophorone diisocyanate trimer (70% solids, 12.3 wt % NCO) sold by Rhodia (Cranbury, N.J.).
Polyol: Desmophen® 870 BA is a hydroxyl-functional polyacrylate resin supplied in butyl acetate (70% solids) by Bayer Corporation (Pittsburgh, Pa.).
Isocyanate: Desmodur N-3390 is a polyisocyanate based on hexamethylene diisocyanate (HDI) supplied in butyl acetate (90% solids) by Bayer Corporation (Pittsburgh, Pa.).
Tegokat® 218 is dibutyltindilaurate sold by Goldschmidt (McDonald, Pa.).

Test Methods:

Stylometer Scratch Adherence:

A spherical diamond is pressed against a coating surface at a constant rate of loading as the sample moves at a constant rate of travel. Force is increased until the coating catastrophically fails. The failure force is a measure of relative adherence for samples of similar character and thickness. It is believed that techniques can be developed to measure coating tensile strength, elastic limit, scratch resistance, friction coefficient and other physical properties.

The scratch platform, contains the diamond stylus, constant rate of travel sample stage, and a force measurement transducer which is mounted below the deck. An acoustic transducer, mounted on the stylus, is used to identify the point of initiation of sample micro-cracking and senses the coating or substrate failure. Acoustic energy, applied diamond force and tangential (diamond drag) force are plotted as a function of travel distance, as well as effective friction.

From the force measurements the "effective friction" is calculated and plotted. During the initiation portion of the test the diamond slides across the coating; thus the acoustic output is low; the effective friction constant. When micro-cracking of the coating starts, the acoustic output increases. Abrupt increases in applied force, drag force, effective friction, or acoustic energy are called "events". The "critical event" is the earliest point at which coating removal is observed and its force level is the measure of adherence. This conclusion is made on the basis of subsequent microscopic confirmation of the failure point DISTINCTNESS OF IMAGE (DOI) Distinctness of reflected image, or DOI, is a quantification of the spread of light reflected at the specular angle. It gives an indication of how sharp the image reflected by an object is. Evaluation of DOI of the coatings of the invention involved the projection of various size images onto a painted surface and determining how small of image can be seen clearly. The image forming patterns (Landolt rings) were projected from a fluorescent-lighted box at a specified distance of 100 mm over the sample under examination. A value of 100 was assigned to the smallest set of rings and a value of 90, 80, 70 etc, to the next uniformly increasingly larger rings to quantitatively evaluate the DOI of the painted surface. Coatings which allowed the inside of the smallest rings to be clearly discerned when projected from the light box were assigned a rating of 100. (GM9101P, General Motors Engineering Standard)

Thermogravimetric Analysis

Thermogravimetric analysis was performed using a TA Instruments New Castle, DE) TGA 2950. Approximately 7 to 12 mg of a single piece of the test specimen was placed in a Pt pan and heated to 1000° C. at 10° C./min under an air atmosphere and the weight loss continuously monitored and recorded. The weight loss at 500° C. was reported. The uncertainty was estimated to be ±5% based on duplicate analysis.

Examples 1-5A and Comparison Example 1

The isocyanate, carbinol-functional silicone resin (CSR) (shown in Table 1 below), butyl acetate solvent, and organic polyol as described in Table 2 were added to a mixing dish and stirred vigorously with a spatula. In Table 2 below, BA denotes n-butyl acetate. Testing was performed on polished steel panels. The formulations were applied via 6 mil (wet) drawdown bar. The coated panels were allowed to air dry for fifteen minutes and then oven cured for 30 minutes at 265° F. All of the samples resulted in films with excellent gloss and flow with the exception of Example 5 the surface of which was severely wrinkled. The DOI was measured (see test description above) and the results reported in Table 3.

TABLE 1

| CSR | Composition |
|---|---|
| 1 | $_M PrOH_{0.60T} Ph_{0.378}$ |
| 2 | $_M PrOH_{0.355T} Me_{0.314T} Ph_{0.314}$ |
| 3 | $_M PrOH_{0.387T} Ph_{0.583}$ |
| 4 | $_M PrOH_{0.180T} Ph_{0.793}$ |
| 5 | $M_{0.261 M} PrOH_{0.082T} Ph_{0.628}$ |
| 6 | $_M iBuOH_{0.310M} H_{0.052T} Ph_{0.609}$ |
| 7 | $_M Phenol_{0.512T} Me_{0.423}$ |
| 8 | $_M PrOH_{0.38T} Ph_{0.41} Q_{0.21}$ |
| 9 | $_M PrOH_{0.372T} Me_{0.415T} Ph_{0.192}$ |
| 10 | $_M PrOH_{0.502T} Me_{0.450}$ |
| Linear 1 | 3-hydroxypropyl terminated polydimethylsiloxane |

In Table 1 above:
$_M PrOH$ denotes $(HO(CH_2)_3)(CH_3)_2 SiO_{1/2}$
$_D PrOH$ denotes $(HO(CH_2)_3)(CH_3)SiO_{2/2}$
$_M iBuOH$ denotes $(HOCH_2 CH(CH_3)CH_2)(CH_3)_2 SiO_{1/2}$
$_M Phenol$ denotes $(HOC_6 H_4(CH_2)_3)(CH_3)_2 SiO_{1/2}$
$_D Phenol$ denotes $(HOC_6 H_4(CH_2)_3)(CH_3)SiO_{2/2}$
$_M$ denotes $(CH_3)_3 SiO_{1/2}$
$_D$ denotes $(CH_3)_2 SiO_{2/2}$
$_D Ph$ denotes $(C_6 H_5)(CH_3)SiO_{2/2}$
$_T Ph$ denotes $C_6 H_5 SiO_{3/2}$
$_T Me$ denotes $CH_3 SiO_{3/2}$
$_M H$ denotes $(H)(CH_3)_2 SiO_{1/2}$

TABLE 2

| | Weight in grams | | | | | | |
|---|---|---|---|---|---|---|---|
| Components | Ex1 | Ex2 | Ex3 | Ex4 | Ex5 | Ex5A | Cex1 |
| Polyol: Desmophen ® 870 BA | 59.4 | 60.7 | 55.7 | 55.7 | 49.5 | 49.5 | 61.9 |
| BA | 9.2 | 7.9 | 11.9 | 12.5 | 20.7 | 21.1 | 12.9 |
| CSR 4 (50% in BA) | 6.2 | | | | | | |
| CSR 5 (50% in BA) | | 6.2 | | | | | |
| CSR 3 (50% in BA) | | | 7.2 | | | | |
| CSR 2 (50% in BA) | | | | 6.6 | | | |
| CSR 1 | | | | | 4.6 | | |
| CSR 10 | | | | | | 4.2 | |
| Isocyanate: Desmodur N-3390 | 25.2 | 25.2 | 25.2 | 25.2 | 25.2 | 25.2 | 25.2 |
| Total | 100 | 100 | 100 | 100 | 100 | 100 | 100 |
| Wt % Siloxane Resin (solids) | 4.6 | 4.5 | 5.5 | 5.1 | 7.4 | 6.8 | 0 |

TABLE 3

| Distinctness of Image (DOI) of Coating on Bare Steel | | | | | | | |
|---|---|---|---|---|---|---|---|
| | Ex1 | Ex2 | Ex3 | Ex4 | Ex5 | Ex5A | Cex1 |
| DOI | 80 | 100 | 100 | 100 | 100 | 50 | 80 |

Summary of Examples 1-5A and Comparison Example 1

Incorporation of carbinol-functional silicone resins is shown in most cases to enhance or maintain the distinctness of image compared to the base urethane coating without any silicone resin added (Cex1).

Examples 6-15 and Comparison Example 2

The isocyanate, carbinol siloxane resin, butyl acetate solvent and organic polyol as described in Table 4 below (formulations ranging from approximately 3 to 10% Si were prepared) were added to a mixing dish and stirred vigorously with a spatula.

Testing was performed on steel panels supplied with E-coat, primer and black basecoat (ACT Laboratories; Hillsdale, Mich.). The formulations were applied via 6 mil (wet) drawdown bar. The coated panels were allowed to air dry for fifteen minutes and then oven cured for 30 minutes at 265° F. All of the samples resulted in films with excellent gloss and flow. The scratch resistance in Kg (see test method description below) was measured and the results reported in Table 5

TABLE 4

| | weight in grams | | | | | | | | | | |
|---|---|---|---|---|---|---|---|---|---|---|---|
| Components | Ex6 | Ex7 | Ex8 | Ex9 | Ex10 | Ex11 | Ex12 | Ex13 | Ex14 | Ex15 | Cex2 |
| Polyol: Desmophen ® 870 BA | 15.2 | 14.7 | 15.3 | 15.0 | 14.9 | 13.5 | 14.9 | 13.5 | 13.5 | 10.4 | 15.5 |
| n-Butyl Acetate (BA) | 2.7 | 2.1 | 2.6 | 1.4 | 3.1 | 3.0 | 3.1 | 3.1 | 4.5 | 6.4 | 3.2 |
| CSR 4 (50% in BA) | 0.8 | 1.9 | | | | | | | | | |
| CSR 5 (50% in BA) | | | 0.8 | 2.3 | | | | | | | |

TABLE 4-continued

| Components | weight in grams | | | | | | | | | | |
|---|---|---|---|---|---|---|---|---|---|---|---|
| | Ex6 | Ex7 | Ex8 | Ex9 | Ex10 | Ex11 | Ex12 | Ex13 | Ex14 | Ex15 | Cex2 |
| CSR 3(50% in BA) | | | | | 0.7 | 2.2 | | | | | |
| CSR 2 (50% in BA) | | | | | | | 0.7 | 2.1 | | | |
| CSR 1 | | | | | | | | | 0.7 | 1.9 | |
| Isocyanate: Desmodur N-3390 | 6.3 | 6.3 | 6.3 | 6.3 | 6.3 | 6.3 | 6.3 | 6.3 | 6.3 | 6.3 | 6.3 |
| Total | 25 | 25 | 25 | 25 | 25 | 25 | 25 | 25 | 25 | 25 | 25 |
| Wt % Silicone Resin (solids) | 2.3 | 5.7 | 2.3 | 6.7 | 2.2 | 6.9 | 2.0 | 6.4 | 4.5 | 12.7 | 0 |

TABLE 5

Scratch Resistance(SR)(Kg) of Coating on Pre-Coated Steel

| | Ex6 | Ex7 | Ex8 | Ex9 | Ex10 | Ex11 | Ex12 | Ex13 | Ex14 | Ex15 | Cex2 |
|---|---|---|---|---|---|---|---|---|---|---|---|
| SR (Kg) | 2.1 | 1.8 | 1.7 | 1.7 | 2.1 | 1.2 | 1.8 | 1.7 | 1.1 | 2.0 | 1.3 |

Summary of Examples 6-15 and Comparison Example 2

Incorporation of a carbinol-functional silicone resin is shown to significantly enhance the scratch resistance compared to the base urethane coating without any silicone resin added. The exception to this was observed in Example 11 and Example 14 where slight reduction in scratch resistance was measured.

Examples 16-19 and Comparison Examples 3-4

Example 16

2.64 grams (g) of carbinol-functional silicone resin 6 was syringed into an aluminum dish. 2.35 g of Tolonate XIDT 70SB, 3.00 g of butyl acetate solvent, and 3 drops of Tegokat® 218 were added and the materials were mixed well at room temperature using a wooden stir rod. The material was cured for 4 hours at 100° C. in air followed by a 1 hour post cure at 200° C. in a nitrogen purged oven. The resulting material was a tough, colorless, transparent solid. The cured silicone-polyurethane hybrid material was analyzed by Thermogravimetric analysis in air and the results are displayed in Table 6.

Example 17

4.16 g of carbinol-functional silicone resin 6 were syringed into an aluminum dish. 2.36 g of Desmodur N-3390, 3.00 g of butyl acetate solvent, and 3 drops of Tegokat® 218 were added and the materials were mixed well at room temperature using a wooden stir rod. The material was cured for 4 hours at 100° C. in air followed by a 1 hour post cure at 200° C. in a nitrogen purged oven. The resulting material was a tough, elastomeric translucent solid. The cured silicone-polyurethane hybrid material was analyzed by Thermogravimetric analysis in air and the results are displayed in Table 6.

Example 18

0.88 g of carbinol-functional siloxane resin 7 was syringed into an aluminum dish. 2.35 g of Tolonate XIDT 70SB, 2.96 g of butyl acetate solvent and 3 drops of Tegokat® 218 were added and the materials were mixed well at room temperature using a wooden stir rod. The material cured for 4 hours at 100° C. in air followed by a 1 hour post cure at 200° C. in a nitrogen purged oven. The resulting material was a tough, slightly tan, transparent solid. The cured silicone-polyurethane hybrid material was analyzed by Thermogravimetric analysis in air and the results are displayed in Table 6.

Example 19

1.26 g of carbinol-functional silicone resin 6 were syringed into an aluminum dish. 2.37 g of Desmodur N-3390, 4.g of Desmophen ® 870 BA, 2.96 g of butyl- acetate solvent and 3 drops of Tegokat® 218 were added and the materials were mixed well at room temperature using a wooden stir rod. The material was cured for 4 hours at 100° C. in air followed by a 1 hour post cure at 200° C. in a nitrogen purged oven. The resulting material was a tough, rigid, slightly hazy solid. The cured silicone-polyurethane hybrid material was analyzed by Thermogravimetric analysis in air and the results are displayed in Table 6.

Comparative Example 3

5.76 g of Desmophen® 870 BA was syringed into an aluminum dish. 3.76 g of Tolonate XIDT 70SB, 2.96 g of butyl acetate solvent, and 3 drops of Tegokat® 218, were added and the materials were mixed well at room temperature using a wooden stir rod. The material was cured for 4 hours at 100° C. in air followed by a 1 hour post cure at 200° C. in a nitrogen purged oven. The resulting material was a rigid, brittle, slightly hazy solid. The cured polyurethane material was analyzed by Thermogravimetric analysis in air and the results are displayed in Table 6.

Comparative Example 4

5.78 g of polyol Desmophen® 870 BA was syringed into an aluminum dish. 2.35 g of Desmodur N-3390, 2.96 g of butyl acetate solvent, and 3 drops of Tegokat® 218, were added and the materials were mixed well at room temperature using a wooden stir rod. The material was cured for 4 hours at 100° C. in air followed by a 1 hour post cure at 200° C. in a nitrogen purged oven. The resulting material was a tough, rigid, slightly hazy solid. The cured polyurethane material was analyzed by Thermogravimetric analysis in air and the results are displayed in Table 6.

TABLE 6

| Ingredients | Ex16 | Ex17 | Ex18 | Ex19 | Cex3 | Cex4 |
|---|---|---|---|---|---|---|
| Desmophen ® 870 BA | | | | 4.08 g | 5.76 g | 5.78 g |
| Desmodur N-3390 | | 2.36 g | | 2.37 g | | 2.35 g |
| Tolonate XDIT 70SB | 2.35 g | | 2.35 g | | 3.76 g | |
| CSR 6 | 2.64 g | 4.16 g | | 1.26 g | | |
| CSR 7 | | | 0.88 g | | | |
| Butyl Acetate | 3.00 g | 3.00 g | 2.96 g | 2.96 g | 2.96 g | 2.96 g |
| Dibutyltin-dilaurate catalyst | 3 drops | 3 drops | 3 drops | 3 drops | 3 drops | 3 drops |
| TGA Results 500° C. Weight Loss % (in air) | 58.1 | 51.9 | 79.1 | 83.2 | 91.8 | 95.9 |

SUMMARY

Examples 16-19 show the utility of carbinol-functional silicone resins as partial or total replacements for organic polyols in urethane materials to enhance the thermal stability of the resulting thermoset material (compared to controls Cex3 and Cex4).

Examples 20-25A and Comparison Examples 5-6

Polyol: Desmophen® 870 BA is a hydroxyl-functional polyacrylate resin supplied in butyl acetate (70% solids) by Bayer Corporation (Pittsburgh, Pa.). Isocyanate: Desmodur N-3390 is a polyisocyanate based on hexamethylene diisocyanate (HDI) supplied in butyl acetate (90% solids) by Bayer Corporation (Pittsburgh, Pa.). BA: n-butyl acetate.

RECOATABILITY: The conditions (Application method, film thickness and cure schedule) for this test are specified relative to the specific coating formulation. After the initial cure, the specimen is overcoated with both the same paint formulation and the control coat. After curing the topcoat, the panels are rated in regards to the ability of the second coat to wet the underlying film.

5—Excellent wetting and flow; no film defects such as craters and fisheyes

4—Slight dewetting and/or edge crawling; minimal defects

3—Moderate dewetting and/or edge crawling; minimal defects

2—Extensive dewetting and/or edge crawling; Few defects

1—Extensive dewetting and/or edge crawling; Numerous defects

0—Severe dewetting and/or edge crawling; Extensive defects

The above isocyanate, above polyol, one of the carbinol-functional silicone resins (CSRs) prepared in Table 1 above, and n-butyl acetate (solvent) were added to a mixing dish and stirred vigorously with a spatula. Testing was performed on polished steel panels. The formulations were applied via 6 mil (wet) drawndown bar. The coated panels were allowed to air dry for fifteen minutes and then oven cured for 30 minutes at 265° F. The appearance of the cured films were evaluated for appearance with 1=poor and 5=excellent and the values recorded in Table 7.

The cured films were then coated perpendicular to the original coating with the identical formulation and the new coatings were cured identical to the first coat (air dry for fifteen minutes and then oven cured for 30 minutes at 265° F). The recoatability of each on was evaluated and recorded in Table 7.

TABLE 7

| | Coating Formulations (weight in grams) | | | | | | | | | |
|---|---|---|---|---|---|---|---|---|---|---|
| Components | Cex5 | Ex20 | Ex21 | Ex22 | Ex23 | Ex24 | Ex25 | Ex25A | Cex6 | Wt % Phenyl in CSR or Linear 1 |
| Polyol | 15.5 | 11.4 | 12.5 | 12.7 | 14.2 | 13.2 | 12.2 | 11.1 | 13.5 | |
| BA | 3.2 | 3.2 | 3.2 | 3.2 | 3.2 | 2.7 | 3.2 | 3.2 | 3.2 | |
| CSR 4 | | 1.5 | | | | | | | | 35.3 |
| CSR 5 | | | 1.6 | | | | | | | 40.0 |
| CSR 6 | | | | 1.6 | | | | | | 56.6 |
| CSR 7 | | | | | 1.7 | | | | | 62.2 |
| CSR 8 | | | | | | 2.2 | | | | 48.3 |
| CSR 9 | | | | | | | 1.6 | | | 34 |
| CSR 10 | | | | | | | | 1.5 | | 0 |
| Linear 1 | | | | | | | | | 1.7 | 0 |
| Isocyanate: Desmodur N-3390 | 6.3 | 6.3 | 6.3 | 6.3 | 6.3 | 6.3 | 6.3 | 6.3 | 6.3 | |
| Total | 25 | 22 | 24 | 24 | 25 | 24 | 23 | 22 | 25 | |
| Wt % Siloxane Resin (solids) | 0 | 10 | 10 | 10 | 10 | 10 | 10 | 10 | 10 | |
| Initial Coating Quality 1 = poor 5 = perfect | 3 | 4 | 1* | 4 | 3 | 3 | 1** | 1** | 1^ | |
| Recoatability 1 = poor 5 = perfect | 2 | 4 | 2 | 4 | 3 | 3 | 2 | 1 | 1 | |

*denotes orange peel
**denotes severe orange peel
^denotes uniform but very hazy

SUMMARY

The coatings which contained carbinol-functional silicone resins (CSRs) with phenyl present exhibited both good initial coating quality and recoatability as good or better than the Cex5 which has no silicone added. The comparison example Cex6, a coating containing linear carbinol-functional siloxanes, exhibited both poor initial film quality and recoatability.

Examples 26-29 and Comparative Example 7

Carbinol-functional silicone resins in Polyurethane foam formulations

Materials:

OPTIMA® $H_2O$ (Fisher Scientific, Fair Lawn, N.J.)

DABCO® 33 LV—a gellation catalyst containing 33% triethylenediamine and 67% dipropylene glycol from Air Products and Chemicals, Inc., Allentown, Pa.

DABCO® BL-11—a blowing catalyst containing 70% bis(dimethylaminoethyl)ether and 30% dipropylene glycol from Air Products and Chemicals, Inc., Allentown, Pa.

DABCO® T-12—a strong gellation catalyst containing dibutyltindilaurate from Air Products and Chemicals, Inc., Allentown, Pa.

VORANOL® 3512A—a glycerine initiated polyether polyol having a molecular weight of about 3500 from The Dow Chemical Company, Midland, Mich.

TDI—toluene diisocyanate from Bayer, Pittsburgh, Pa.

DABCO® DC5982 Surfactant—a silicone glycol copolymer dispersed in polyol from Dow Corning Corporation Midland, Mich.

Methylene Chloride from Fisher Scientific, Fair Lawn, N.J.

Methods:

Thermogravimetric Analysis

Thermogravimetric analysis was performed using a TA Instruments (New Castle, DE) TGA 2950. Approximately 7 to 12 mg of a single piece of the test specimen was placed in a Pt pan and heated to 1000° C. at 10° C./min under an air and a nitrogen atmosphere in separate tests and the weight loss continuously monitored and recorded. The weight loss at 200° C. and 350° C. was reported. The uncertainty was estimated to be ±5% based on duplicate analysis.

Comparative Example 7

150.05 g of VORANOL® 3512A, 5.25 g of OPTIMA® $H_2O$, 0.23 g of DABCO® 33 LV, and 0.07 g of DABCO® BL-11 were measured into a paper bucket and mixed at high speed for 30 seconds. Next, 0.75 g of DABCO® DC5982 Surfactant, 0.30 g of DABCO® T-12 and 22.5 g of methylene chloride were added to the bucket and the contents were mixed at medium speed for 10 seconds. Then 71.0 g of toluene diisocyanate were added to the bucket and the contents were mixed at high speed for 5 seconds. The foam was allowed to rise and the foam was allowed to cure at room temperature for 10 minutes. Finally, the foam was placed in a 200° F. oven for 20 minutes. The cured foam was removed from the oven and the height was measured immediately and Thermogravimetric analysis was completed with results reported in Table 8.

Example 26

135.05 g of VORANOL® 3512A, 12.96 g of CSR 5 from Table 1 above, 5.25 g of OPTIMA® $H_2O$, 0.23 g of DABCO® 33 LV, and 0.07 g of DABCO® BL-11 were measured into a paper bucket and mixed at high speed for 30 sec. Next, 0.75 g of DABCO® DC5982 Surfactant, 0.30 g of DABCO® T-12 and 22.5 g of methylene chloride were added to the bucket and the contents were mixed at medium speed for 10 seconds. Then 71.0 g of toluene diisocyanate were added to the bucket and the contents were mixed at high speed for 5 seconds. The foam was allowed to rise and the foam was allowed to cure at room temperature for 10 minutes. Finally, the foam was placed in a 200° F. oven for 20 minutes. The cured foam was removed from the oven and the height was measured immediately and Thermogravimetric analysis was completed with results reported in Table 8.

Example 27

90.03 g of VORANOL® 3512A, 51.84 g of CSR 5 from Table 1 above, 5.25 g of OPTIMA® $H_2O$, 0.23 g of DABCO® 33 LV, and 0.07 g of DABCO® BL-11 were measured into a paper bucket and mixed at high speed for 30 sec. Next, 0.75 g of DABCO® DC5982 Surfactant, 0.30 g of DABCO® T-12, and 22.5 g of methylene chloride were added to the bucket and the contents were mixed at medium speed for 10 seconds. Then 71.0 g of toluene diisocyanate were added to the bucket and the contents were mixed at high speed for 5 seconds. The foam was allowed to rise and the foam was allowed to cure at room temperature for 10 minutes. Finally, the foam was placed in a 200° F. oven for 20 minutes. The cured foam was removed from the oven and the height was measured immediately and Thermogravimetric analysis was completed with results reported in Table 8.

Example 28

135.05 g of VORANOL® 3512A, 14.02 g of CSR 6 from Table 1 above, 5.25 g of OPTIMA® $H_2O$, 0.23 g of DABCO® 33 LV, and 0.07 g of DABCO® BL-11 were measured into a paper bucket and mixed at high speed for 30 seconds. Next, 0.75 g of DABCO® DC5982 Surfactant, 0.30 g of DABCO® T-12 and 22.5 g of methylene chloride were added to the bucket and the contents were mixed at medium speed for 10 seconds. Then 71.0 g of toluene diisocyanate were added to the bucket and the contents were mixed at high speed for 5 seconds. The foam was allowed to rise and the foam was allowed to cure at room temperature for 10 minutes. Finally, the foam was placed in a 200° F. oven for 20 minutes. The cured foam was removed from the oven and the height was measured immediately and Thermogravimetric analysis was completed with results reported in Table 8.

Example 29

90.03 g of VORANOL® 3512A, 56.09 g of CSR 6 from Table 1 above, 5.25 g of OPTIMA® $H_2O$, 0.23 g of DABCO® 33 LV, and 0.07 g of DABCO® BL-11 were measured into a paper bucket and mixed at high speed for 30 seconds. Next, 0.75 g of DABCO® DC5982 Surfactant, 0.30 g of DABCO® T-12, and 22.5 g of methylene chloride were added to the bucket and the contents were mixed at medium speed for 10 seconds. Then 71.0 g of toluene diisocyanate were added to the bucket and the contents were mixed at high speed for 5 seconds. The foam was allowed to rise and the foam was allowed to cure at room temperature for 10 minutes.

Finally, the foam was placed in a 200° F. oven for 20 minutes. The cured foam was removed from the oven and the height was measured immediately and Thermogravimetric analysis was completed with results reported in Table 8.

TABLE 8

|  | Cex7 | Ex26 | Ex27 | Ex28 | Ex29 |
|---|---|---|---|---|---|
| Wt % Siloxane Resin (solids) | 0 | 5.9 | 24.4 | 6.4 | 25.9 |
| Foam Height (mm) | 416.67 | 422.66 | 309.67 | 431.37 | 382.88 |
| Weight Loss (%) Air 200° C. | 1.55 | 1.03 | 1.87 | 0.10 | 0.53 |
| Weight Loss (%) Air 350° C. | 93.34 | 87.30 | 82.70 | 87.08 | 78.40 |
| Weight Loss (%) Nitrogen 200° C. | 2.37 | 0.98 | 2.22 | 0.98 | 1.13 |
| Weight Loss (%) Nitrogen 350° C. | 59.39 | 51.34 | 52.21 | 47.80 | 53.47 |

SUMMARY

Table 8 shows that adding carbinol-functional silicone resins to a urethane foam formulation reduces the weight loss of the resulting foam in both air and nitrogen environments while maintaining similar foam heights to the control.

Example 30 and Comparative Examples 8-10

Materials:
Trimethylolpropane monoallylether (Sigma-Aldrich Chemical Co., Milwaukee Wis.).
DOW CORNING 6-3570 Polymer (Trimethylsilyl-terminated dimethylsiloxy/methylhydrogensiloxy co-polymer) (Dow Corning, Midland, Mich.).
Triphenylphosphine (Sigma-Aldrich Chemical Co., Milwaukee Wis.)
Allyl alcohol (Sigma-Aldrich Chemical Co. Milwaukee Wis.)
FC-24 —trifluoromethanesulfonic acid, available from 3M, St. Paul, Minn.

Methods:

60° Gloss (ASTM D523-89) Measured gloss ratings are obtained by comparing the specular reflectance from the sample to that from a black glass standard. Sixty-degree gloss was used for comparing samples. Testing is performed using a Glossmeter (BYK-Gardner Micro-Tri-gloss, Catalog #4522). A minimum of five readings are taken on the coating surface and the average is reported.

Two comparative carbinol-functional linear polysiloxanes and a carbinol-functional siloxane resin were synthesized and formulated into a urethane coating formulation at 9.3wt % loading using Desmodur N-3390 isocyanate and Desmophen 870 BA polyol to provide a 1:1 isocyanate:carbinol stoichiometric ratio and butyl acetate as a diluting solvent. with the details of the formulation described in Table 9. In addition, a non-silicone containing urethane coating was prepared. The formulations were applied to 3"×6" and 3"×9" acetone degreased, aluminum panels using a 6 mil draw down bar. The coated panels were allowed to air dry for 15 minutes and then oven cured for 30 minutes at 265° F. The coated panels were evaluated for coating quality, distinctness of image and 60° gloss and the results are recorded in Table 9

The carbinol-functional resin used in example 30 (CSR30) was prepared as follows: Water (282.1 g) was added to a mixture of methyltrimethoxysilane (858.5 g), phenyltrimethoxysilane (1249.4 g) and trifluoromethanesulfonic acid (1.05 g). After distillative removal of by-product methanol, toluene (1368.1 g), tetramethyldisiloxane (435.2 g) and acetic acid (195.1 g) were added. After heating at 50-55° C. for three hours, volatiles were removed via distillation until the reaction mixture was at 80° C. Toluene 370.9 g) was added and the mixture washed with water and aqueous sodium bicarbonate, then dried via azeotropic distillation to a concentration of approximately 60 wt %. Allyl alcohol (846.8 g) was added. After heating to 88° C., 1% Pt/Al2O3 (1.53 g) was added and the mixture heated at reflux for approximately six hours. Triphenylphosphine (0.061 g) and decolorizing carbon (3.0 g) were added, the mixture filtered and volatiles removed in vacuo, then redissolved to approximately 76 wt % in butyl acetate. The resulting resin structure was determined by $^{29}$Si NMR to be $M^{PrOH}_{0.32}T^{Me}_{0.35}T^{Ph}_{0.33}$ with a carbinol equivalent weight of 355 based on solids.

The comparative linear carbinol-functional polysiloxane (Linear 2) used in comparative example 8 (Cex8) was prepared as follows: A toluene solution of a divinyltetramethyldisiloxane complex of platinum (0.53 g of a 4810 ppm Pt solution) was added to a heated (65° C.) mixture of a 5 cSt 0.76 wt % reactive hydrogen (as Si—H) trimethylsilyl-terminated dimethylsiloxy/methylhydrogensiloxy co-polymer (5.0 g) available from Dow Corning (Midland, Mis.) as 6-3570 Polymer and allyl alcohol (155.2 g), followed by addition of 95.0 grams more of the co-polymer. The mixture was kept at ≧75° C. for thirty minutes, then triphenylphosphine (0.0153 g) was added. The mixture filtered and volatiles removed in vacuo. The resulting material was a linear carbinol siloxane oligomer with no $RSiO_{3/2}$ units and had a carbinol equivalent weight of 249.

The comparative linear carbinol-functional polysiloxane (Linear 3) used in comparative example 9 (Cex9)was prepared as follows: A toluene solution of a divinyltetramethyldisiloxane complex of platinum (0.56 g of a 4810 ppm Pt solution) was added to a heated (80° C) mixture of a 5 cSt 0.76 wt % reactive hydrogen (as Si—H) trimethylsilyl-terminated dimethylsiloxy/methylhydrogensiloxy co-polymer (5.03 g) available from Dow Corning (Midland, MI) as 6-3570 Polymer and trimethylolpropane monoallyl ether (170.84 g), followed by addition of 95.22 grams more of the co-polymer. The mixture was kept at ≧85° C. for approximately ten minutes. The resulting material was a linear carbinol siloxane oligomer with no $RSiO_{3/2}$ units and had a carbinol equivalent weight of 169. Comparative Example 10 (Cex10) coating was prepared using organic isocyanate (Desmodur N-3390) and organic polyol (Desmophen 870 BA) as previously described.

TABLE 9

| Coating Formulations (weight in grams) | | | | |
|---|---|---|---|---|
| Components | Ex 30 | Cex8 | Cex9 | Cex10 |
| Desmophen 870 BA | 1.94 | 2.10 | 2.26 | 1.90 |
| CSR 30 (76% in BA) | 0.71 | | | |
| Linear 2 | | 0.55 | | |
| Linear 3 | | | 0.55 | |
| Isocyanate: Desmodur N-3390 | 4.35 | 4.36 | 4.19 | 5.10 |
| Wt % Carbinol Siloxane Resin or Linear (solids) | 9.3 | 9.3 | 9.3 | 0 |
| Initial Coating Quality 1 = poor 5 = perfect | 5 | 3^ | 1* | 4 |
| Distinctness of Image | 90 | 60 | 10 | 80 |
| 60° Gloss | 131.2 | 124.3 | 97.4 | 131.3 |

^denotes uniform but hazy
*denotes orange peel

Summary for Example 30 and Comparative Examples 8-10

From Table 9, the results show that formulating with a carbinol-functional siloxane resin containing $RSiO_{3/2}$ units provides siloxane modified urethane coatings without reducing the film quality in terms of initial coating quality, distinctness of image and gloss relative to a urethane system with no siloxane added (Cex10) as well as a urethane system having linear siloxanes incorporated (Cex8-9). This enables the coating formulator to incorporate silicones with added thermal resistance (see examples 16-19) into urethane coatings without reduction in appearance characteristics.

The invention claimed is:

1. A urethane-forming composition comprising: (A) at least one compound containing at least one isocyanate group; and (B) a carbinol-functional silicone resin comprising the units:

$(R^1_3SiO_{1/2})_a$ (i)
$(R^2_2SiO_{2/2})_b$ (ii)
$(R^3SiO_{3/2})_c$ (iii) and
$(SiO_{4/2})_d$ (iv)

wherein $R^1$ and $R^2$ are each independently a hydrogen atom, an alkyl group having from 1 to 8 carbon atoms, an aryl group, a carbinol group free of aryl groups having at least 3 carbon atoms, or an aryl-containing carbinol group having at least 6 carbon atoms, $R^3$ is an alkyl group having from 1 to 8 carbon atoms or an aryl group, a has a value of less than or equal to 0.6, b has a value of zero or greater than zero, c has a value of greater than zero, d has a value of less than 0.5, and the value of a+b+c+d=1, and with the proviso that when each $R^2$ is methyl the value of b is less than 0.3; where the mole ratio of carbinol groups to isocyanate groups is from about 0.8:1 to 1.2:1.

2. A urethane-forming composition comprising: (A) 100 weight parts of at least one compound containing at least one isocyanate group; (B) 3-300 weight parts of a carbinol-functional silicone resin comprising the units:

$(R^1_3SiO_{1/2})_a$ (i)
$(R^2_2SiO_{2/2})_b$ (ii)
$(R^3SiO_{3/2})_c$ (iii) and
$(SiO_{4/2})_d$ (iv)

wherein $R^1$ and $R^2$ are each independently a hydrogen atom, an alkyl group having from 1 to 8 carbon atoms, an aryl group, a carbinol group free of aryl groups having at least 3 carbon atoms, or an aryl-containing carbinol group having at least 6 carbon atoms, $R^3$ is an alkyl group having from 1 to 8 carbon atoms or an aryl group, a has a value of less than or equal to 0.6, b has a value of zero or greater than zero, c has a value of greater than zero, d has a value of less than 0.5, and the value of a+b+c+d=1, and with the proviso that when each $R^2$ is methyl the value of b is less than 0.3; (C) up to 250 weight parts of an organic polyol; and (D) up to 10 weight parts of a cure rate modifier.

3. A urethane composition obtained by a method comprising reacting (A) at least one compound containing at least one isocyanate group; and (B) a carbinol-functional silicone resin comprising the units:

$(R^1_3SiO_{1/2})_a$ (i)
$(R^2_2SiO_{2/2})_b$ (ii)
$(R^3SiO_{3/2})_c$ (iii) and
$(SiO_{4/2})_d$ (iv)

wherein $R^1$ and $R^2$ are each independently a hydrogen atom, an alkyl group having from 1 to 8 carbon atoms, an aryl group, a carbinol group free of aryl groups having at least 3 carbon atoms, or an aryl-containing carbinol group having at least 6 carbon atoms, $R^3$ is an alkyl group having from 1 to 8 carbon atoms or an aryl group, a has a value of less than or equal to 0.6, b has a value of zero or greater than zero, c has a value of greater than zero, d has a value of less than 0.5, and the value of a+b+c+d=1, and with the proviso that when each $R^2$ is methyl the value of b is less than 0.3, where the mole ratio of carbinol groups to isocyanate groups is from about 0.8:1 to 1.2:1.

4. A urethane composition obtained by a method comprising reacting (A) 100 weight parts of at least one compound containing at least one isocyanate group; (B) 3-300 weight parts of a carbinol-functional silicone resin comprising the units:

$(R^1_3SiO_{1/2})_a$ (i)
$(R^2_2SiO_{2/2})_b$ (ii)
$(R^3SiO_{3/2})_c$ (iii) and
$(SiO_{4/2})_d$ (iv)

wherein $R^1$ and $R^2$ are each independently a hydrogen atom, an alkyl group having from 1 to 8 carbon atoms, an aryl group, a carbinol group free of aryl groups having at least 3 carbon atoms, or an aryl-containing carbinol group having at least 6 carbon atoms, $R^3$ is an alkyl group having from 1 to 8 carbon atoms or an aryl group, a has a value of less than or equal to 0.6, b has a value of zero or greater than zero, c has a value of greater than zero, d has a value of less than 0.5, and the value of a+b+c+d=1, and with the proviso that when each $R^2$ is methyl the value of b is less than 0.3; (C) up to 250 weight parts of an organic polyol; and (D) up to 10 weight parts of a cure rate modifier.

5. The urethane-forming composition according to claim 1 further comprising (C) an organic polyol.

6. The urethane-forming composition according to claim 1, further comprising (D) a cure rate modifier.

7. The urethane-forming composition according to claim 1 wherein:

the alkyl group is methyl;
the aryl group is phenyl;
the carbinol group free of aryl groups having at least 3 carbon atoms is selected from a group having the formula $R^4OH$ wherein $R^4$ is selected from
(1) a group having the formula $-(CH_2)_x-$ where x has a value of 3 to 10,
(2) $-CH_2CH(CH_3)-$,
(3) $-CH_2CH(CH_3)CH_2-$,
(4) $-CH_2CH_2CH(CH_2CH_3)CH_2CH_2CH_2-$, and
(5) a group having the formula $-OCH(CH_3)(CH_2)_x-$ wherein x has a value of 1 to 10 and a group having the formula $R^6(OH)$ wherein $R^6$ is a group having the formula $-CH_2CH_2(CH_2)_xOCH_2CH-$ wherein x in each case has a value of 1 to 10;

the aryl-containing carbinol group having at least 6 carbon atoms is a group having the formula $R^5OH$ wherein $R^5$ is selected from
(1) a group having the formula $-(CH_2)_xC_6H_4-$ wherein x has a value of 0 to 10,
(2) a group having the formula $-CH_2CH(CH_3)(CH_2)_xC_6H_4-$ wherein x has a value of 0 to 10, and
(3) a group having the formula $-(CH_2)_xC_6H_4(CH_2)_x-$ wherein x has a value of 1 to 10.

8. The urethane-forming composition of claim 1 where a has a typical value of 0.1 to 0.6, b has a typical value of 0 to 0.4, c has a typical value of 0.3 to 0.8, and d has a typical value of 0 to 0.3.

9. The urethane-forming composition according to claim 1 wherein the carbinol-functional silicone resin is selected from carbinol-functional silicone resins comprising the units:

$((CH_3)_3SiO_{1/2})_a$
$((R^2)CH_3SiO_{2/2})_b$ where $R^2=-(CH_2)_3C_6H_4OH$ $((C_6H_5)CH_3SiO_{2/2})_b$ and
$(C_6H_5SiO_{3/2})_c$, carbinol-functional silicone resins comprising the units:
$((R^1)(CH_3)_2SiO_{1/2})_a$ where $R^1$=—$(CH_2)_3C_6H_4OH$ and
$(C_6H_5SiO_{3/2})_c$, carbinol-functional silicone resins comprising the units:
$((R_1)(CH_3)_2SiO_{1/2})_a$ where $R^1$=—$(CH_2)_3C_6H_4OH$ and
$(CH_3SiO_{3/2})_c$, carbinol-functional silicone resins comprising the units:
$((R^1)(CH_3)_2SiO_{1/2})_a$ where $R^1$=—$(CH_2)_3OH$ and
$(C_6H_5SiO_{3/2})_c$, carbinol-functional silicone resins comprising the units:
$((R^1)(CH_3)_2SiO_{1/2})_a$ where $R^1$=—$(CH_2)_3OH$
$(CH_3SiO_{3/2})_c$ and
$(C_6H_5SiO_{3/2})_c$, carbinol-functional silicone resins comprising the units:
$((CH_3)_3SiO_{1/2})_a$
$((R^2)CH_3SiO_{2/2})_b$ where $R^2$=—$(CH_2)_3OH$
$((C_6H_5)CH_3SiO_{2/2})_b$ and
$(C_6H_5SiO_{3/2})_c$, carbinol-functional silicone resins comprising the units:
$((CH_3)_3SiO_{1/2})_a$
$((R^1)(CH_3)_2SiO_{1/2})_a$ where $R^1$=—$(CH_2)_3OH$ and
$(C_6H_5SiO_{3/2})_c$, carbinol-functional silicone resins comprising the units:
$((R^1)(CH_3)_2SiO_{1/2})_a$ where $R^1$=—$CH_2CH(CH_3)CH_2OH$
$((H)(CH_3)_2SiO_{1/2})_a$ and
$(C_6H_5 SiO_{3/2})_c$, carbinol-functional silicone resins comprising the units:
$((R^1)(CH_3)_2SiO_{1/2})_a$ where $R^1$=—$(CH_2)_3OH$
$(CH_3SiO_{3/2})_c$ wherein a has a typical value of 0.1 to 0.6, b has a typical value of zero to 0.4, and c has a typical value of 0.3 to 0.8.

10. The urethane-forming composition according to claim 1, wherein greater than 10 weight percent of the $R^1+R^2+R^3$ groups are phenyl.

11. The urethane-forming composition according to claim 1 wherein the urethane composition further comprises at least one ingredient selected from fillers, solvents, plasticizers, pigments, colorants, dyes, surfactants, thickeners, heat stabilizers, leveling agents, anti-cratering agents, fillers, sedimentation inhibitors, ultraviolet-light absorbers, promoters, heat stabilizers, ultraviolet-light absorbers, and antioxidants.

12. The urethane-forming composition according to claim 1 wherein the urethane compositions further comprise at least one cell stabilizer and at least one blowing agent, and optionally chain extenders and crosslinkers.

13. The urethane-forming composition according to claim 12, wherein the cell stabilizer is a silicone polyether and the blowing agent is selected from water, liquid carbon dioxide, CFCs, HCFCs, HFCs, and pentane.

14. The urethane-forming composition of claim 2, where the mole ratio of carbinol groups to isocyanate groups is from about 0.8:1 to 1.2:1.

15. The urethane composition of claim 4, where the mole ratio of carbinol groups to isocyanate groups is from about 0.8:1 to 1.2:1.

16. The urethane-forming composition according to claim 2 wherein the carbinol-functional silicone resin is selected from carbinol-functional silicone resins comprising the units:
$((CH_3)_3SiO_{1/2})_a$
$((R^2)CH_3SiO_{2/2})_b$ where $R^2$=—$(CH_2)_3C_6H_4OH$
$((C_6H_5)CH_3SiO_{2/2})_b$ and
$(C_6H_5SiO_{3/2})_c$, carbinol-functional silicone resins comprising the units:
$((R^1)(CH_3)_2SiO_{1/2})_a$ where $R^1$=—$(CH_2)_3C_6H_4OH$ and
$(C_6H_5SiO_{3/2})_c$, carbinol-functional silicone resins comprising the units:
$((R^1)(CH_3)_2SiO_{1/2})_a$ where $R^1$=—$(CH_2)_3C_6H_4OH$ and
$(CH_3SiO_{3/2})_c$, carbinol-functional silicone resins comprising the units:
$((R^1)(CH_3)_2SiO_{1/2})_a$ where $R^1$=—$(CH_2)_3OH$ and
$(C_6H_5SiO_{3/2})_c$, carbinol-functional silicone resins comprising the units:
$((R^1)(CH_3)_2SiO_{1/2})_a$ where $R^1$=—$(CH_2)_3OH$
$(CH_3SiO_{3/2})_c$ and
$(C_6H_5SiO_{3/2})_c$, carbinol-functional silicone resins comprising the units:
$((CH_3)_3SiO_{1/2})_a$
$((R^2)CH_3SiO_{2/2})_b$ where $R^2$=—$(CH_2)_3OH$
$((C_6H_5)CH_3SiO_{2/2})_b$ and
$(C_6H_5SiO_{3/2})_c$, carbinol-functional silicone resins comprising the units:
$((CH_3)_3SiO_{1/2})_a$
$((R^1)(CH_3)_2SiO_{1/2})_a$ where $R^1$=—$(CH_2)_3OH$ and
$(C_6H_5SiO_{3/2})_c$, carbinol-functional silicone resins comprising the units:
$((R^1)(CH_3)_2SiO_{1/2})_a$ where $R^1$=—$CH_2CH(CH_3)CH_2OH$
$((H)(CH_3)_2SiO_{1/2})_a$ and
$(C_6H_5SiO_{3/2})_c$, carbinol-functional silicone resins comprising the units:
$((R^1)(CH_3)_2SiO_{1/2})_a$ where $R^1$=—$(CH_2)_3OH$
$(CH_3SiO_{3/2})_c$ wherein a has a typical value of 0.1 to 0.6, b has a typical value of zero to 0.4, and c has a typical value of 0.3 to 0.8.

17. The urethane composition according to claim 4 wherein the carbinol-functional silicone resin is selected from carbinol-functional silicone resins comprising the units:
$((CH_3)_3SiO_{1/2})_a$
$((R^2)CH_3SiO_{2/2})_b$ where $R^2$=—$(CH_2)_3C_6H_4OH$
$((C_6H_5)CH_3SiO_{2/2})_b$ and
$(C_6H_5SiO_{3/2})_c$, carbinol-functional silicone resins comprising the units:
$((R^1)(CH_3)_2SiO_{1/2})_a$ where $R^1$=—$(CH_2)_3C_6H_4OH$ and
$(C_6H_5SiO_{3/2})_c$, carbinol-functional silicone resins comprising the units:
$((R^1)(CH_3)_2SiO_{1/2})_a$ where $R^1$=—$(CH_2)_3C_6H_4OH$ and
$(CH_3SiO_{3/2})_c$, carbinol-functional silicone resins comprising the units:
$((R^1)(CH_3)_2SiO_{1/2})_a$ where $R^1$=—$(CH_2)_3OH$ and
$(C_6H_5SiO_{3/2})_c$, carbinol-functional silicone resins comprising the units:
$((R^1)(CH_3)_2SiO_{1/2})_a$ where $R^1$=—$(CH_2)_3OH$
$(CH_3SiO_{3/2})_c$ and
$(C_6H_5SiO_{3/2})_c$, carbinol-functional silicone resins comprising the units:
$((CH_3)_3 SiO_{1/2})_a$
$((R^2)CH_3SiO_{2/2})_b$ where $R^2$=—$(CH_2)_3OH$
$((C_6H_5)CH_3SiO_{2/2})_b$ and
$(C_6H_5SiO_{3/2})_c$, carbinol-functional silicone resins comprising the units:
$((CH_3)_3SiO_{1/2})_a$
$((R^1)(CH_3)_2SiO_{1/2})_a$ where $R^1$=—$(CH_2)_3OH$ and
$(C_6H_5SiO_{3/2})_c$, carbinol-functional silicone resins comprising the units:
$((R^1)(CH_3)_2SiO_{1/2})_a$ where $R^1$=—$CH_2CH(CH_3)CH_2OH$
$((H)(CH_3)_2SiO_{1/2})_a$ and
$(C_6H_5SiO_{3/2})_c$, carbinol-functional silicone resins comprising the units:
$((R^1)(CH_3)_2SiO_{1/2})_a$ where $R^1$=—$(CH_2)_3OH$
$(CH_3SiO_{3/2})_c$ wherein a has a typical value of 0.1 to 0.6, b has a typical value of zero to 0.4, and c has a typical value of 0.3 to 0.8.

18. The urethane-forming composition according to claim 14 wherein the carbinol-functional silicone resin is selected from carbinol-functional silicone resins comprising the units:
$((CH_3)_3SiO_{1/2})_a$
$((R^2)CH_3SiO_{2/2})_b$ where $R^2$=—$(CH_2)_3C_6H_4OH$
$((C_6H_5)CH_3SiO_{2/2})_b$ and
$(C_6H_5SiO_{3/2})_c$,
carbinol-functional silicone resins comprising the units:
$((R^1)(CH_3)_2SiO_{1/2})_a$ where $R^1$=—$(CH_2)_3C_6H_4OH$ and
$(C_6H_5SiO_{3/2})_c$,
carbinol-functional silicone resins comprising the units:
$((R^1)(CH_3)_2SiO_{1/2})_a$ where $R^1$=—$(CH_2)_3C_6H_4OH$ and
$(CH_3SiO_{3/2})_c$,
carbinol-functional silicone resins comprising the units:
$((R^1)(CH_3)_2SiO_{1/2})_a$ where $R^1$=—$(CH_2)_3OH$ and
$(C_6H_5SiO_{3/2})_c$,
carbinol-functional silicone resins comprising the units:
$((R^1)(CH_3)_2SiO_{1/2})_a$ where $R^1$=—$(CH_2)_3OH$
$(CH_3SiO_{3/2})_c$ and
$(C_6H_5SiO_{3/2})_c$,
carbinol-functional silicone resins comprising the units:
$((CH_3)_3SiO_{1/2})_a$
$((R^2)CH_3SiO_{2/2})_b$ where $R^2$=—$(CH_2)_3OH$
$((C_6H_5)CH_3SiO_{2/2})_b$ and
$(C_6H_5SiO_{3/2})_c$,
carbinol-functional silicone resins comprising the units:
$((CH_3)_3SiO_{1/2})_a$
$((R^1)(CH_3)_2SiO_{1/2})_a$ where $R^1$=—$(CH_2)_3OH$ and
$(C_6H_5SiO_{3/2})_c$,
carbinol-functional silicone resins comprising the units:
$((R^1)(CH_3)_2SiO_{1/2})_a$ where $R^1$=—$CH_2CH(CH_3)CH_2OH$
$((H)(CH_3)2SiO_{1/2})_a$ and
$(C_6H_5SiO_{3/2})_c$,
carbinol-functional silicone resins comprising the units:
$((R^1)(CH_3)_2SiO_{1/2})_a$ where $R^1$=—$(CH_2)_3OH$
$(CH_3SiO_{3/2})_c$
wherein a has a typical value of 0.1 to 0.6, b has a typical value of zero to 0.4, and c has a typical value of 0.3 to 0.8.

19. The urethane composition according to claim 15 wherein the carbinol-functional silicone resin is selected from carbinol-functional silicone resins comprising the units:
$((CH_3)_3SiO_{1/2})_a$
$((R^2)CH_3SiO_{2/2})_b$ where $R^2$=—$(CH_2)_3C_6H_4OH$
$((C_6H_5)CH_3SiO_{2/2})_b$ and
$(C_6H_5SiO_{3/2})_c$,
carbinol-functional silicone resins comprising the units:
$((R^1)(CH_3)_2SiO_{1/2})_a$ where $R^1$=—$(CH_2)_3C_6H_4OH$ and
$(C_6H_5SiO_{3/2})_c$,
carbinol-functional silicone resins comprising the units:
$((R^1)(CH_3)_2SiO_{1/2})_a$ where $R^1$=—$(CH_2)_3C_6H_4OH$ and
$(CH_3SiO_{3/2})_c$,
carbinol-functional silicone resins comprising the units:
$((R^1)(CH_3)_2SiO_{1/2})_a$ where $R^1$=—$(CH_2)_3OH$ and
$(C_6H_5SiO_{3/2})_c$,
carbinol-functional silicone resins comprising the units:
$((R^1)(CH_3)_2SiO_{1/2})_a$ where $R^1$=—$(CH_2)_3OH$
$(CH_3SiO_{3/2})_c$ and
$(C_6H_5SiO_{3/2})_c$,
carbinol-functional silicone resins comprising the units:
$((CH_3)_3SiO_{1/2})_a$
$((R^2)CH_3SiO_{2/2})_b$ where $R^2$=—$(CH_2)_3OH$
$((C_6H_5)CH_3SiO_{2/2})_b$ and
$(C_6H_5SiO_{3/2})_c$,
carbinol-functional silicone resins comprising the units:
$((CH_3)_3SiO_{1/2})_a$
$((R^1)(CH_3)_2SiO_{1/2})_a$ where $R^1$=—$(CH_2)_3OH$ and
$(C_6H_5SiO_{3/2})_c$,
carbinol-functional silicone resins comprising the units:
$((R^1)(CH_3)_2SiO_{1/2})_a$ where $R^1$=—$CH_2CH(CH_3)CH_2OH$
$((H)(CH_3)_2SiO_{1/2})_a$ and
$(C_6H_5SiO_{3/2})_c$,
carbinol-functional silicone resins comprising the units:
$((R^1)(CH_3)_2SiO_{1/2})_a$ where $R^1$=—$(CH_2)_3OH$
$(CH_3SiO_{3/2})_c$
wherein a has a typical value of 0.1 to 0.6, b has a typical value of zero to 0.4, and c has a typical value of 0.3 to 0.8.

* * * * *